(12) United States Patent
Matsubara

(10) Patent No.: US 7,181,077 B2
(45) Date of Patent: Feb. 20, 2007

(54) IMAGE DECOMPRESSION FROM TRANSFORM COEFFICIENTS

(75) Inventor: Akio Matsubara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 126 days.

(21) Appl. No.: 11/028,514

(22) Filed: Jan. 4, 2005

(65) Prior Publication Data

US 2005/0175248 A1    Aug. 11, 2005

Related U.S. Application Data

(63) Continuation of application No. 09/985,784, filed on Nov. 6, 2001, now Pat. No. 6,870,961.

(30) Foreign Application Priority Data

| Nov. 10, 2000 | (JP) | ............................. 2000-344155 |
| Nov. 10, 2000 | (JP) | ............................. 2000-344391 |
| May 14, 2001 | (JP) | ............................. 2001-142942 |
| Jun. 28, 2001 | (JP) | ............................. 2001-195937 |

(51) Int. Cl.
*G06K 9/46* (2006.01)
*G06K 9/32* (2006.01)
*G06K 9/36* (2006.01)

(52) U.S. Cl. ...................... 382/240; 382/300
(58) Field of Classification Search ................. 382/232, 382/233, 235, 240, 248, 250, 272, 277, 298, 382/300; 375/240.11, 240.18, 240.19, 240.23, 375/240.25; 358/398.1, 426.01, 426.04, 358/432, 433
See application file for complete search history.

(56) References Cited

U.S. PATENT DOCUMENTS

| 5,020,120 A | 5/1991 | Weidy |
| 5,602,589 A * | 2/1997 | Vishwanath et al. ... 375/240.11 |
| 5,661,822 A | 8/1997 | Knowles et al. |
| 5,892,847 A | 4/1999 | Johnson |
| 5,909,518 A * | 6/1999 | Chui ........................... 382/277 |
| 6,101,284 A | 8/2000 | Matsubara et al. |
| 6,118,902 A | 9/2000 | Knowles |
| 6,134,350 A | 10/2000 | Beck |

(Continued)

FOREIGN PATENT DOCUMENTS

EP    1148731    10/2001

(Continued)

OTHER PUBLICATIONS

International Search Report dated Jun. 20, 2002 for patent application EP 01125478.6-2202.

(Continued)

*Primary Examiner*—Amir Alavi
(74) *Attorney, Agent, or Firm*—Dickstein Shapiro LLP

(57) ABSTRACT

An image decompressing system includes the processes of: a) determining a size of a decompressed image; b) determining a decomposition level to which decomposition-level-type inverse wavelet transform is performed; and c) decompressing given wavelet transform coefficients to the decomposition level determined by the step b), wherein the step b) determines the decomposition level such that wavelet transform coefficients in the thus-determined decomposition level have a size equal to or nearest to the size of the decomposed image determined by the step a).

12 Claims, 9 Drawing Sheets

U.S. PATENT DOCUMENTS

| | | | |
|---|---|---|---|
| 6,259,820 B1 | 7/2001 | Stone | |
| 6,381,280 B1* | 4/2002 | Lynch et al. | 375/240.19 |
| 6,442,298 B1* | 8/2002 | Nixon | 382/248 |
| 6,643,406 B1 | 11/2003 | Hajjahmad et al. | |
| 6,738,520 B1 | 5/2004 | Acharya et al. | |
| 6,757,326 B1 | 6/2004 | Prieto et al. | |
| 6,757,438 B2* | 6/2004 | Graffagnino | 382/240 |
| 6,778,709 B1 | 8/2004 | Taubman | |
| 6,870,961 B2* | 3/2005 | Matsubara | 382/240 |
| 2002/0006229 A1* | 1/2002 | Chao et al. | 382/240 |
| 2003/0152278 A1* | 8/2003 | Temizel et al. | 382/233 |
| 2004/0141651 A1* | 7/2004 | Hara et al. | 382/232 |
| 2005/0175248 A1* | 8/2005 | Matsubara | 382/240 |

FOREIGN PATENT DOCUMENTS

| | | |
|---|---|---|
| JP | 10327409 | 12/1998 |
| JP | 2000092486 | 3/2000 |
| JP | 2000-125294 | 4/2000 |
| JP | 2000-165664 | 6/2000 |
| JP | 2001-189936 | 7/2001 |
| JP | 2002-152517 | 5/2002 |
| JP | 2002-152744 | 5/2002 |
| WO | WO 99/53429 | 10/1999 |

OTHER PUBLICATIONS

Daniel Andresen, et al.—Scalability Issues for High Performance Digital Libraries on the World Wide Web—Digital Libraries, 1996. ADL "96, Proceedings of the Third Forum on Research and Technology Advances in Washington, D.C., USA May 13-15, 1996, Los Alamitos, CA, USA, IEEE Comput. Soc, US, May 13, 1996, pp. 139-148, XP010164918—ISBN: 0-8186-7402-4—Section " 3. Scalability of the ADL.

* cited by examiner

IMAGE DECOMPRESSION FROM TRANSFORM COEFFICIENTS

This application is a continuation of application Ser. No. 09/985,784, now U.S. Pat. No. 6,870,961 filed Nov. 6, 2001, the subject matter of which is incorporated by reference herein.

BACKGROUND OF THE INVENTION

1. Field of the Invention

The present invention generally relates to image decompression, and, in particular, to image decompression of decompressing image data in a form of wavelet transform coefficients or subband transform coefficients so as to obtain a decompressed image having a given size, in particular, a reduced-sized image such as a thumbnail image.

2. Description of the Related Art

A JPEG scheme which is a conventional encoding scheme for decompressing a coded natural image has been used for decompressing a coded image so as to obtain a decompressed image having a size same as that of an original image (see ISO/IEC 10918-1, 'Information Technology Digital Compressing and Coding of Continuos-tone Still Images'). Therefore, in order to output a coded image to various output devices having different resolutions, expansion/reduction (change in the number of pixels) of an decompressed image should be previously performed. Moreover, in the related art, according to wavelet transform, a decompressed image has the same size as that of an original image. Accordingly, in order to obtain a decompressed image having a size according to a user's request, it is needed to perform a size-change process after performing wavelet inverse transform, so as to adjust the image size.

SUMMARY OF THE INVENTION

The present invention has been devised in consideration of the above-described situation, and, an object of the present invention is to provide an image decompression system obtaining a highly reliable and high definition decompressed image without performing a size-change process after performing a decompression process, or, even when a size-change process is performed so as to obtain a various-sized image, requiring merely a reduced time therefor.

An image decompressing system according to the present invention includes the processes of:

a) determining a size of a decompressed image;

b) determining a decomposition level to which decomposition-level-type inverse wavelet transform is performed; and c) decompressing given wavelet transform coefficients to the decomposition level determined by the process b), wherein the process b) determines the decomposition level such that the wavelet transform coefficients in the thus-determined decomposition level have a size equal to or nearest to the size of the decomposed image determined by the process a).

Thereby, it is possible to obtain a decompressed image having a size near the size determined, that is, input by a user, and also, having a high image quality. Specifically, it is possible to obtain an image having a high image quality at high speed, merely needing a reduced memory capacity, in comparison to a case where, after decompression is performed for all the decomposition levels, sub-sampling is performed thereon.

The decomposition level determined by the process b) may be such that the size of the wavelet transform coefficients of the thus-determined decomposition level is immediately smaller than the size of decompressed image determined by the process a).

Thereby, it is possible to effectively reduce the time required for the decompressing process.

The decomposition level determined by the process b) may be such that the size of the wavelet transform coefficients of the thus-determined decomposition level is immediately larger than the size of decompressed image determined by the process a).

Thereby, it is possible to obtain an image having a size slightly larger than the size indicated by a user.

The above-mentioned system may further include a process d) of performing size-change operation on the decompressed image obtained by the process c) so as to obtain an image having a size precisely equal to the size determined by the process a).

Thereby, it is possible to obtain an image having the size precisely equal to the size indicated by the user.

The wavelet transform coefficients to be decompressed by the process c) may comprise a code stream coded in accordance with JPEG2000, Image Coding System (ISO/IEC, FCD 15444-1).

The above-mentioned system may further include a process e) of performing interpolation operation so as to obtain a bitmap image having the size equal to the size determined by the process a) from the size-changed image obtained by the step d).

In this configuration, it is possible to obtain pixel values of pixels which are not included in the decompressed image by the interpolation operation.

The above-mentioned process e) may comprise the step of performing linear interpolation.

The above-mentioned process e) may comprise a process of using pixel values of pixels near pixels included in the decompressed image.

An image decompressing system according to another aspect of the present invention includes the processes of:

a) determining a size of a decompressed image;

b) determining a decomposition level to which decomposition-level-type inverse subband transform is performed; and c) decompressing given subband transform coefficients to the decomposition level determined by the process b), wherein the step b) determines the decomposition level such that subband transform coefficients in the thus-determined decomposition level have a size equal to or nearest to the size of the decomposed image determined by the process a).

In this system, by utilizing the subband transform coefficients instead of the wavelet transform coefficients as in the above-mentioned scheme, substantially the same effects/advantages can be obtained. In this case, a lower-frequency component of the subband transform coefficients in the decomposition level may be preferably utilized as a lower-frequency component of the transform coefficients has a larger energy, that is, expresses an outline of an original image more faithfully.

An image decompressing system according to another aspect of the present invention includes the processes of:

a) determining a size of a decompressed image;

b) determining a decomposition level up to which decomposition-level-type inverse wavelet transform is performed; and c) decompressing given wavelet transform coefficients to the decomposition level determined by the process b), wherein the process b) determines the decomposition level such that wavelet transform coefficients in the thus-determined decomposition level have a size further smaller than the size of the decomposition level immediately smaller than the size of the decomposed image determined by the process a).

In this system, as the decomposition level up to which decomposition-level-type wavelet inverse transform is performed is further higher than that in the above-mentioned system, it is possible to further improve the processing speed, that is, reduce the time required for the decomposition process more effectively.

The above-mentioned system may further include a process d) of producing a lower-frequency component from LL subband coefficients when the size determined by the process a) is smaller than the size of the LL subband of wavelet transform coefficients in the highest decomposition level.

The above-mentioned process d) may utilize the decomposition-level-type wavelet transform formula used in the system as it is.

The above-mentioned process d) may take averages of adjacent pixels.

The above-mentioned system may further include a process d) of performing size-change operation on the decompressed image obtained by the process c) so as to obtain an image having a size equal to the size determined by the process a).

The above-mentioned system may further include a process e) of performing interpolation operation so as to obtain a bitmap image having the size equal to the size determined by the step a) from the size-changed image obtained by the process d).

The wavelet transform coefficients to be decompressed by the process c) may comprise a code stream coded in accordance with JPEG2000, Image Coding System (ISO/IEC, FCD 15444-1).

An image decompressing system according to another aspect of the present invention includes the processes of:

a) determining a size of a decompressed image;

b) determining a decomposition level up to which decomposition-level-type inverse subband transform is performed; and c) decompressing given wavelet transform coefficients to the decomposition level determined by the process b), wherein the process b) determines the decomposition level such that subband transform coefficients in the thus-determined decomposition level have a size further smaller than the size of the decomposition level immediately smaller than the size of the decomposed image determined by the process a).

Thus, by using subband transform coefficients instead of the wavelet transform coefficients as in the above-mentioned system, substantially the same advantages/effects may be obtained. Also in this scheme, it is preferable to utilize a lower-frequency component of the subband transform coefficients in the decomposition level by the reason same as that mentioned above.

The above-mentioned system may further include a process d) of producing a lower-frequency component from LL subband coefficients when the size determined by the process a) is smaller than the size of the LL subband of wavelet transform coefficients in the highest decomposition level.

The above-mentioned process d) may utilize the decomposition-level-type wavelet transform formula used in the system as it is.

The above-mentioned process d) may take averages of adjacent pixels.

The above-mentioned system may further include a process d) of performing size-change operation on the decompressed image obtained by the process c) so as to obtain an image having a size equal to the size determined by the process a).

The above-mentioned system may further include a process e) of performing interpolation operation so as to obtain a bitmap image having the size equal to the size determined by the process a) from the size-changed image obtained by the process d).

BRIEF DESCRIPTION OF THE DRAWINGS

Other objects and further features of the present invention will become more apparent from the following detailed description when read in conjunction with the following accompanying drawings.

DETAILED DESCRIPTION OF THE PREFERRED EMBODIMENTS

First, a configuration and a principle of operation of an image decompression method in a first embodiment of the present invention in a case where a wavelet transform scheme is applied will now be described.

A decomposition-level-type wavelet transform scheme is such that respective subbands are obtained as a result of an image being decomposed into wavelet transform coefficients in a range between a high-frequency component and a low-frequency component when the image is coded. Thereby, an LL component or subband (a component of low frequency vertically and horizontally of the original image) is obtained as a low-frequency component having a size of $\frac{1}{2}^n$ of the original image horizontally and vertically, and, by using this LL component, a size-change process (size reduction) may not be needed.

Further, according to the decomposition-level-type wavelet transform scheme, different from a JPEG scheme in which contiguity pixels are taken by sub-sampling from a bitmap image obtained through decompression, a high definition decompressed image can be produced, without losing any information of contiguity pixels of an original image, by utilizing a low-frequency component of the nearest decomposition level corresponding to a size-reduced image requested by a user.

Figure 1:
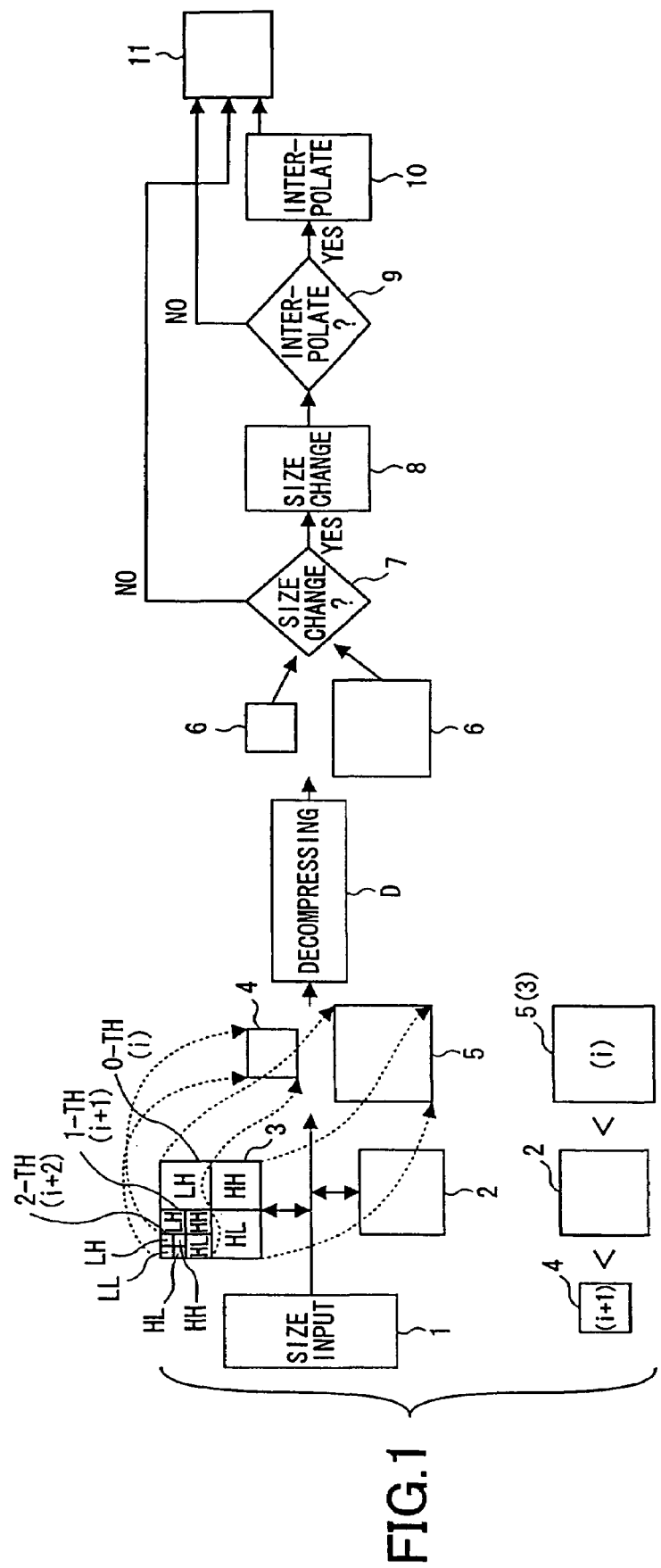
FIG. 1 shows an operation flow of an image decompressing method in a first embodiment of the present invention employing a decomposition-level-type wavelet transform scheme.

FIG. 1 shows an image decompressing method in the first embodiment of the present invention in which a user inputs a desired image size and decompresses from an already coded natural image (wavelet transform coefficients), and, in particular, a bitmap image is obtained according to the input image size.

As shown in the figure, this method includes an image size determination step 1, by which an image size 2 is determined according to a request by a user. In this case, it is assumed that the ratio between the vertical length and horizontal length of image is fixed.

In this system, wavelet transform coefficients 3 previously obtained through wavelet transform and stored in a buffer memory are used. Specifically, the wavelet transform coefficients 4 in a decomposition level (i+1) having a size immediately larger than or equal to the determined size 2, or the wavelet transform coefficients 5 in a decomposition level (i) having a size immediately smaller than or equal to the determined size 2 are utilized. That is, the decomposition level 'i' (integer) determined by the following formula (1) is obtained:

$$\text{(original image size)}/2^{i+1} \leq \text{(determined image size)} < \text{(original image size)}/2^i \quad (1)$$

That is, in FIG. 1, the wavelet transform coefficients 4 in the immediately higher decomposition level 'i+1' (=1) correspond to the LL subband in the 0-th decomposition level (i=0), and, thus, the size of the wavelet transform coefficients 4 is ½ (¼ in area) of the original wavelet transform coefficients 3. By thus utilizing the lowest-frequency (vertically and horizontally) component (subband), it is possible to obtain a decompressed image having a high definition at high speed, as a lower-frequency component (subband) of transform coefficients has a higher energy, and, thus, expresses an outline of the original image more faithfully. The wavelet transform coefficients 5 in the immediately lower decomposition level 'i' (=0) correspond to the whole four subbands in the 0-th decomposition level, and, thus, the size of the wavelet transform coefficients 5 is the same as that of the original wavelet transform coefficients 3.

Then, the wavelet transform coefficients in the decomposition level i or i+1 are decompressed in a next decompressing step D, and, thus, decomposition-level-type inverse wavelet transform is performed from the highest or last decomposition level (i+2=2, in the example of FIG. 1) up to the decomposition level i+1 (=1) or from the highest or last decomposition level (i+2=2, in the example of FIG. 1) up to the decomposition level i (=0), so as to obtain a decompressed image 6.

The system further includes a size-change determination step 7, a size-change processing step 8, an interpolation determination step 9, and an interpolation processing step 10. Thereby, size-change processing is performed on the thus-obtained decompressed image 6 in the size-change processing step 8 when the size-change determination step 7 determines that the size of the decompressed image 6 is not equal to the determined image size 2 and also size change should be performed so that the equal size of image be obtained. When the size-change operation is not performed and the decompressed image obtained in the decompressing step D is output as it is, a higher definition image can be provided while the size may be slightly different from the size indicated by the user.

In this case of performing size change, the interpolation step 10 performs interpolation operation on the thus-size-changed image when the interpolation determination step 9 determines that interpolation should be performed. Thus, a bitmap image 11 having the size equal to the determined size 2 is obtained. When the interpolation is not performed, pixels of a bitmap image to be output do not include pixels which are not included in the decompressed image. However, it becomes possible to reduce a time required for the processing.

In case where the size-change determination part 7 determines that no size change is needed, the decompressed image 6 is used as the bitmap image 11 as it is. In case where the size-change processing is performed, a well-known size-change form/scheme may be utilized. For example, a drawing function of Microsoft, Stretch DIB (Device Independence Bitmap), down-sampling/up-sampling scheme as disclosed in Japanese Laid-Open Patent Applications Nos. 2000-165664 and 2000-125294 of Sony, or the like, may be used.

When the size-change operation is performed, as the size of the image changes, each pixel of the image before the size-change operation may not correspond to a respective pixel of the image after undergoing the size-change operation. In a case where each pixel of the image before the size-change operation does not correspond to a respective pixel of the image after undergoing the size-change operation, interpolation operation may be performed in the interpolation processing step 6. For the interpolation operation, a well-known interpolation form/scheme may be utilized, for example, a linear interpolation scheme, a bi-cubic scheme, or the like.

By omitting the interpolation operation, it is possible to save a memory capacity and reduce a time required for the entire decompressing process. However, by performing the interpolation operation, it is possible to obtain a higher-quality decompressed image.

In the above-described process, the wavelet transform coefficients (in a form of code stream) coded in accordance with a scheme defined by JPEG2000, Image Coding System (ISO/IEC, FCD 15444-1) may be decompressed into a natural image in the decompressing step D. Thereby, as the decompression is made to conform to the international standard JPEG2000, it is possible to provide compatibility with, and, thus, even from coefficients provided by various systems, a bitmap image 11 can be obtained by the image decompressing system according to the present invention.

Figure 2:
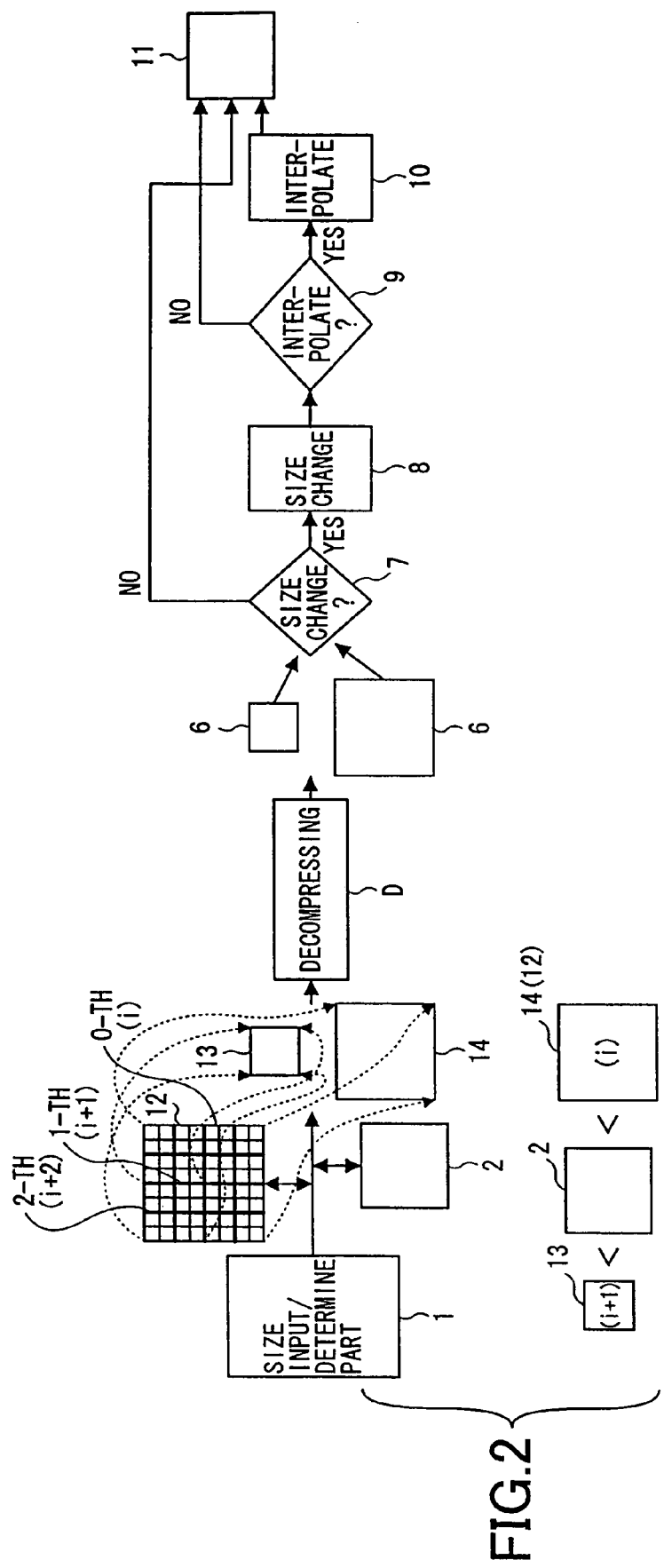
FIG. 2 shows an operation flow of an image decompressing method in a second embodiment of the present invention employing a decomposition-level-type subband transform scheme.

Moreover, the bitmap image 11 may also be obtained through decompressing subband transform coefficients into a natural image, similarly. FIG. 2 shows an image decompressing method/system in a second embodiment of the present invention in which the bitmap image 11 is obtained through decompressing subband transform coefficients into a natural image. The image decompressing system in the second embodiment is the same as the decompressing system in the first embodiment shown in FIG. 1 except that the wavelet transform coefficients 3 are replaced by subband transform coefficients 12.

The subband transform coefficients 12 are different from the wavelet transform coefficients 3 in that, while, in the wavelet transform coefficients 3, level by level, only the LL subband is further decomposed up to the highest (last) decomposition level, all the four subbands are further decomposed up to the highest (last) decomposition level, level by level, respectively, in the same way, as shown in FIG. 2.

In the system shown in FIG. 2, the lowest-frequency-component (vertically and horizontally) subband transform coefficients 13 in the decomposition level (i+1=1) having a size immediately smaller than the image size 2 indicated by a user or the lowest-frequency-component (vertically and horizontally) subband transform coefficients 14(12) in the decomposition level (i=0) having a size immediately larger than the image size 2 indicated by a user is utilized. The lowest-frequency-component (vertically and horizontally) subband transform coefficients 13 in the decomposition level has the size which is ½ (¼ in area) the size of the original subband transform coefficients 12, and corresponds to the LL subband of the original subband coefficients 12. The lowest-frequency-component (vertically and horizontally) subband transform coefficients 14 in the decomposition level has the size which is the same as that of the original subband transform coefficients 12. By thus utilizing the lowest-frequency (vertically and horizontally) component, it is possible to obtain a decompressed image having a high definition at high speed, as a lower-frequency component (subband) of transform coefficients has a higher energy, and, thus, expresses an outline of the original image more faithfully.

Then, the subband transform coefficients 14 or 13 in the decomposition level i or i+1 are decompressed in a next decompressing step D, and, thus, decomposition-level-type inverse subband transform is performed from the highest or last decomposition level (i+2=2', in the example of FIG. 2) up to the decomposition level i+1 (=1) or from the highest or last decomposition level (i+2=2, in the example of FIG. 1) up to the decomposition level i (=0) for the relevant subband (lowest-frequency (vertically and horizontally) component), so as to obtain a decompressed image 6.

With reference FIG. 3, an image decompressing system/method in a third embodiment of the present invention will now be described. The difference between the above-described first embodiment shown in FIG. 1 and the third embodiment shown in FIG. 3 will now be described. In the third embodiment, instead of utilizing the wavelet transform coefficients (4, in FIG. 1) in the decomposition level 'i+1' immediately smaller than the determined/requested image size (2, in FIG. 1) nor the wavelet transform coefficients (5, in FIG. 1) in the decomposition level 'i' immediately larger than the determined/required image size, the wavelet transform coefficients (23, in FIG. 3) in the decomposition level 'i+2' (=2, in the example of FIG. 3) further higher than the decomposition level 'i+1' (=1, in FIG. 3) having the size immediately smaller than the determined/required image size (2). Thereby, in comparison to the first embodiment shown in FIG. 1, it is possible to further improve the processing speed or to reduce a time required for the decompressing process further effectively.

In this case, the wavelet transform coefficients 23 in the decomposition level 'i+2' (=2) which corresponds to the LL subband of and thus further higher than the decomposition level 'i+1' (=1) which corresponds to the LL subband of the wavelet transform coefficients in the 0-th decomposition level (which corresponds to the original wavelet transform coefficients 3) is utilized, and, thus, the size of the wavelet transform coefficients 23 is ¼ (1/16 in area) of the original wavelet transform coefficients 3. Further, thus, the lowest-frequency (vertically and horizontally) component (subband) in the decomposition level is used. The reason therefor is the same as that mentioned above.

Then, the wavelet transform coefficients in the decomposition level i+2 are decompressed by the step D, and, thus, decomposition-level-type inverse wavelet transform is performed from the highest or last decomposition level (2-th or second level, in the example of FIG. 3) up to the decomposition level i+2 (=2) so as to obtain a decompressed image 25. Thus, in the example of FIG. 3, the inverse wavelet transform is performed only on the 2-th (second) decomposition level which corresponds to the LL subband of the 1-th (first) decomposition level (which corresponds to the LL subband of the original wavelet transform coefficients 3).

The other configuration is the same as that described with reference to FIG. 1, and duplicated description is omitted.

Figure 3:
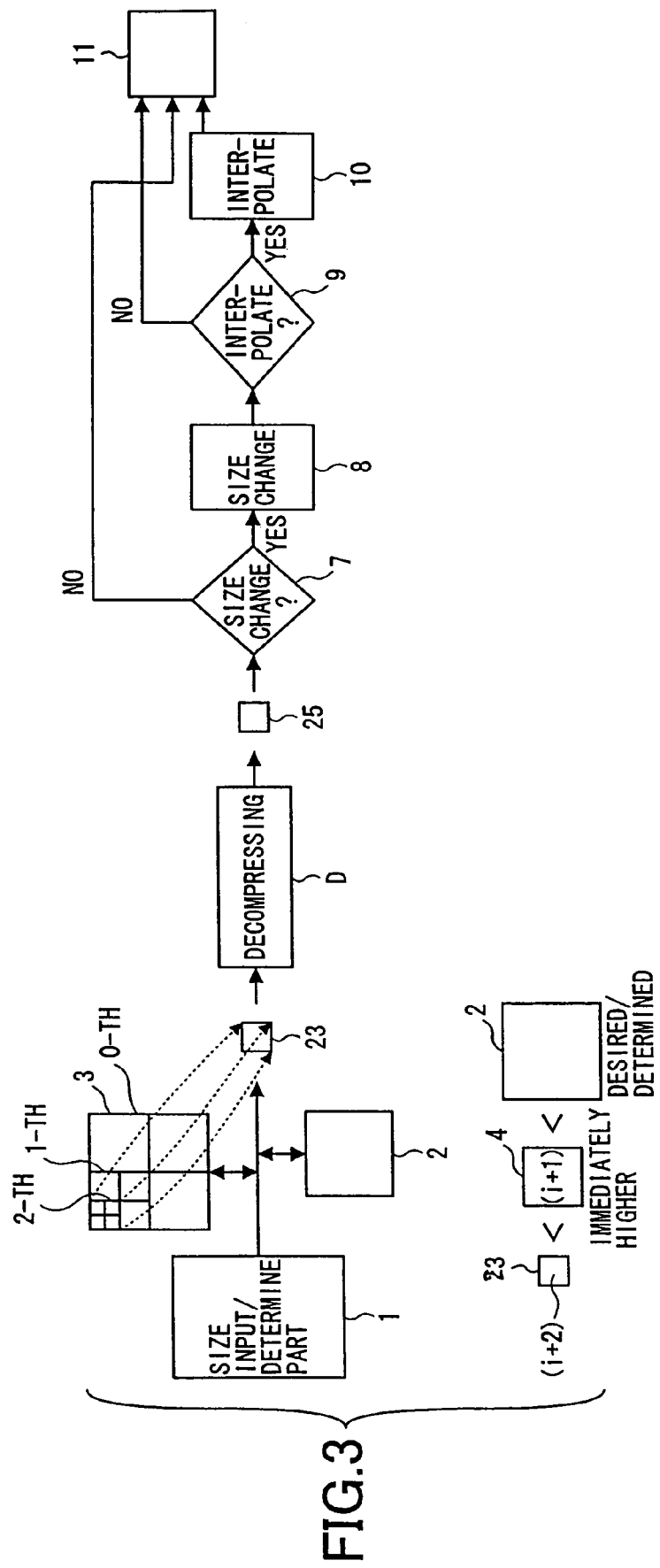
FIG. 3 shows an operation flow of an image decompressing method in a third embodiment of the present invention employing a decomposition-level-type wavelet transform scheme.
Figure 4:
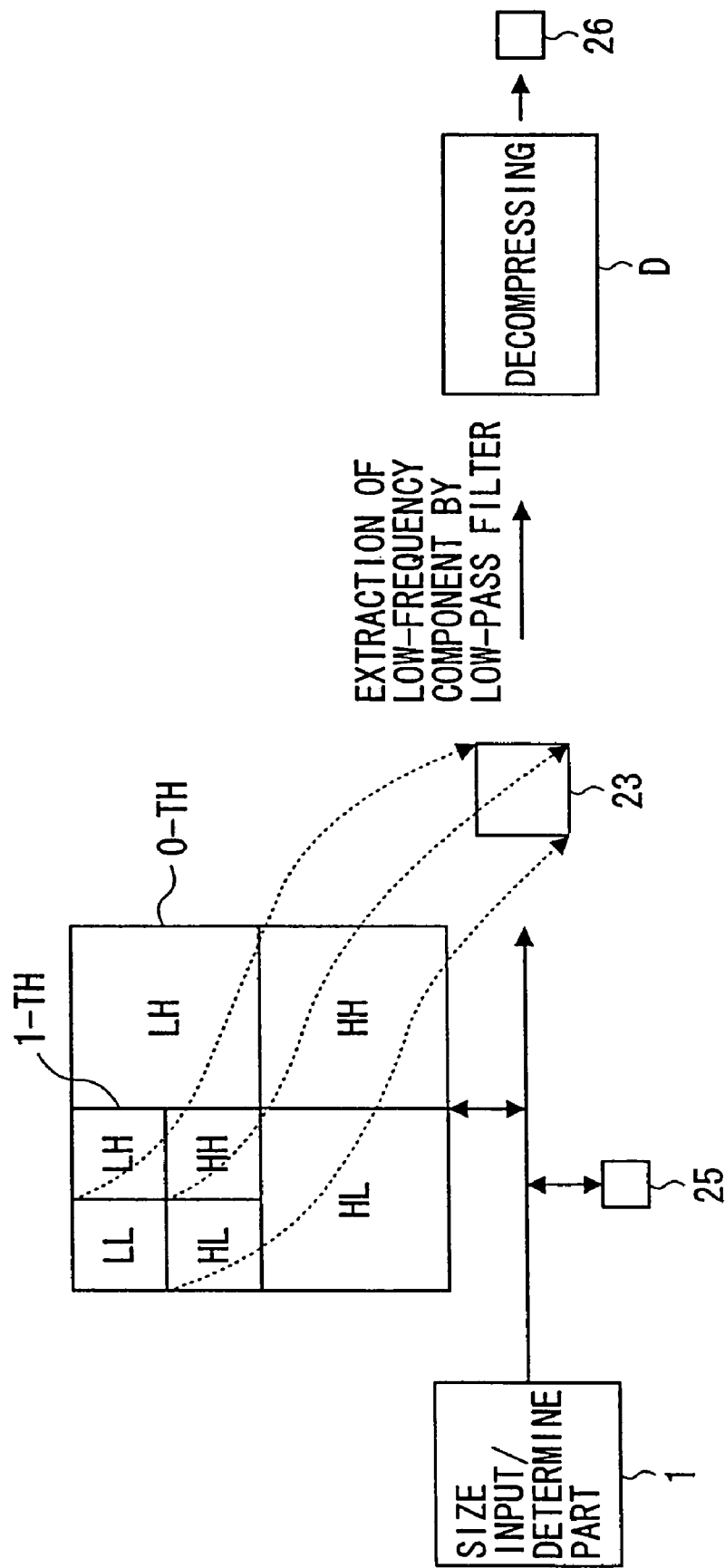
FIG. 4 shows an operation flow of the image decompressing method in the third embodiment of the present invention in a case where a size of an image indicated by a user is smaller than the size of the LL subband of the wavelet transform coefficients in the highest or last decomposition level.

Moreover, when the decompressed image size determined by the image size determination step 1 is smaller than the size of the LL subband in the highest (last) decomposition level of the wavelet transform coefficients (in the example of FIG. 3, when the image size indicated by a user is smaller than the LL subband of the second decomposition level (2-th), that is, is smaller than the size which is ⅛ (1/64 in area) the original wavelet transform coefficients 3), decomposing processing or lower-frequency-component extracting processing is performed on the wavelet transform coefficients of the LL subband of the highest (last) decomposition level so as to obtain the wavelet transform coefficients of the LL subband in the further highest decomposition level. This processing is repeated until the size of the lowest-frequency (vertically and horizontally) component (subband) of the wavelet transform coefficients in the thus-obtained highest decomposition level becomes smaller than the decompressed image size determined by the image size determination step 1 or indicated by a user, as shown in FIG. 4. After that, through the decompressing step D, a decompressed image having the size smaller than the desired/determined image size is obtained.

This decomposition processing may be performed such that, after level shift is performed so as to make a color component expressed by the system be expressed by a non-sign integer, and, then, a lower-frequency component (LL subband, for example) than the LL subband in the current highest (last) decomposition level is obtained by using the operation formula used in the wavelet filter bank as it is. Alternatively, a lower-frequency component (LL subband, for example) than the lowest (vertically and horizontally) LL subband in the current highest (last) decomposition level may be obtained by simply taking an average of contiguity pixels. Since no additional hardware is needed in such a scheme, and, in the case of taking an average, merely an addition circuit and a shift circuit are needed. Accordingly, high-speed operation is possible.

In extracting a lower-frequency component from the wavelet transform coefficients of the LL subband 23 in the highest decomposition level in FIG. 4, the same wavelet transform formula (same filter bank) as that used in decomposing operation to extract the above-mentioned wavelet transform coefficients in the highest decomposition-level 23 may be utilized as mentioned above. Further alternatively, for the same purpose, simple sampling or thinning-out operation may be employed, or a drawing function of performing size change such as the above-mentioned Stretch DIB may be utilized.

Figure 5:
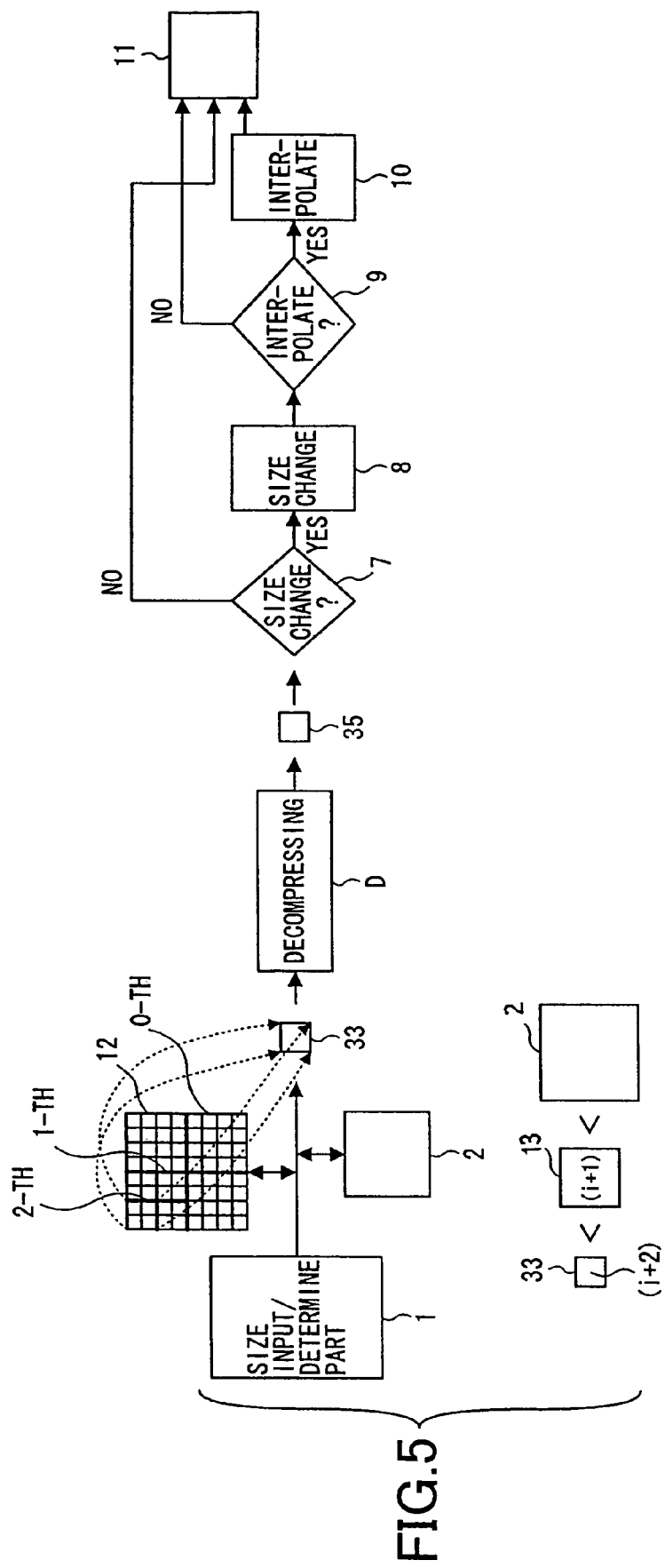
FIG. 5 shows an operation flow of an image decompressing method in a fourth embodiment of the present invention employing a decomposition-level-type subband transform scheme.

Moreover, the bitmap image 11 may also be obtained through decompressing subband transform coefficients into a natural image instead of decompressing wavelet transform coefficients, similarly. FIG. 5 shows an image decompressing system/method in a fourth embodiment of the present invention in which the bitmap image 11 is obtained through decompressing subband transform coefficients into a natural image. The image decompressing system in the fourth embodiment is the same as the decompressing system in the above-described third embodiment shown in FIG. 3 except that the wavelet transform coefficients 3 are replaced by subband transform coefficients 12.

As described above, according to subband transform, not only a lowest-frequency (vertically and horizontally) component (LL subband) but higher-frequency components (HH, HL, LH subbands) are decomposed in each decomposition level, different from the wavelet transform scheme.

Therefore, also by the fourth embodiment, same as in the above-described third embodiment, it is possible to obtain a high-quality decompressed image having a size nearest to a size input by a user, at high speed, needing a reduced memory capacity.

FIG. 5 shows a flow of operation/control starting from providing a subband transform image (subband transform coefficients), then input of a size of image by a user, and ending at providing a decompressed bitmap image 11.

In this case, the subband transform coefficients 33 in the decomposition level 'i+2' (=2) which corresponds to the LL subband of and further higher than the decomposition level 'i+1' (=1) which corresponds to the LL subband of the subband transform coefficients in the 0-th decomposition level (which corresponds to the original wavelet transform coefficients 12) is utilized, and, thus, the size of the subband transform coefficients 33 is ¼ (¹⁄₁₆ in area) of the original wavelet transform coefficients 12. Further, thus, the lowest-frequency component (subband) in the decomposition level is used. The reason therefor is the same as that mentioned above.

Then, the above-mentioned subband transform coefficients 33 in the decomposition level i+2 are decompressed by the step D, and, thus, decomposition-level-type inverse subband transform is performed from the highest or last decomposition level (2-th or second level, in the example of FIG. 5) up to the decomposition level i+2 (=2) so as to obtain a decompressed image 35. Thus, in the example of FIG. 5, the inverse subband transform is performed only on the 2-th (second) decomposition level which corresponds to the LL subband of the 1-th (first) decomposition level (which corresponds to the LL subband of the original wavelet transform coefficients 3).

Figure 6:
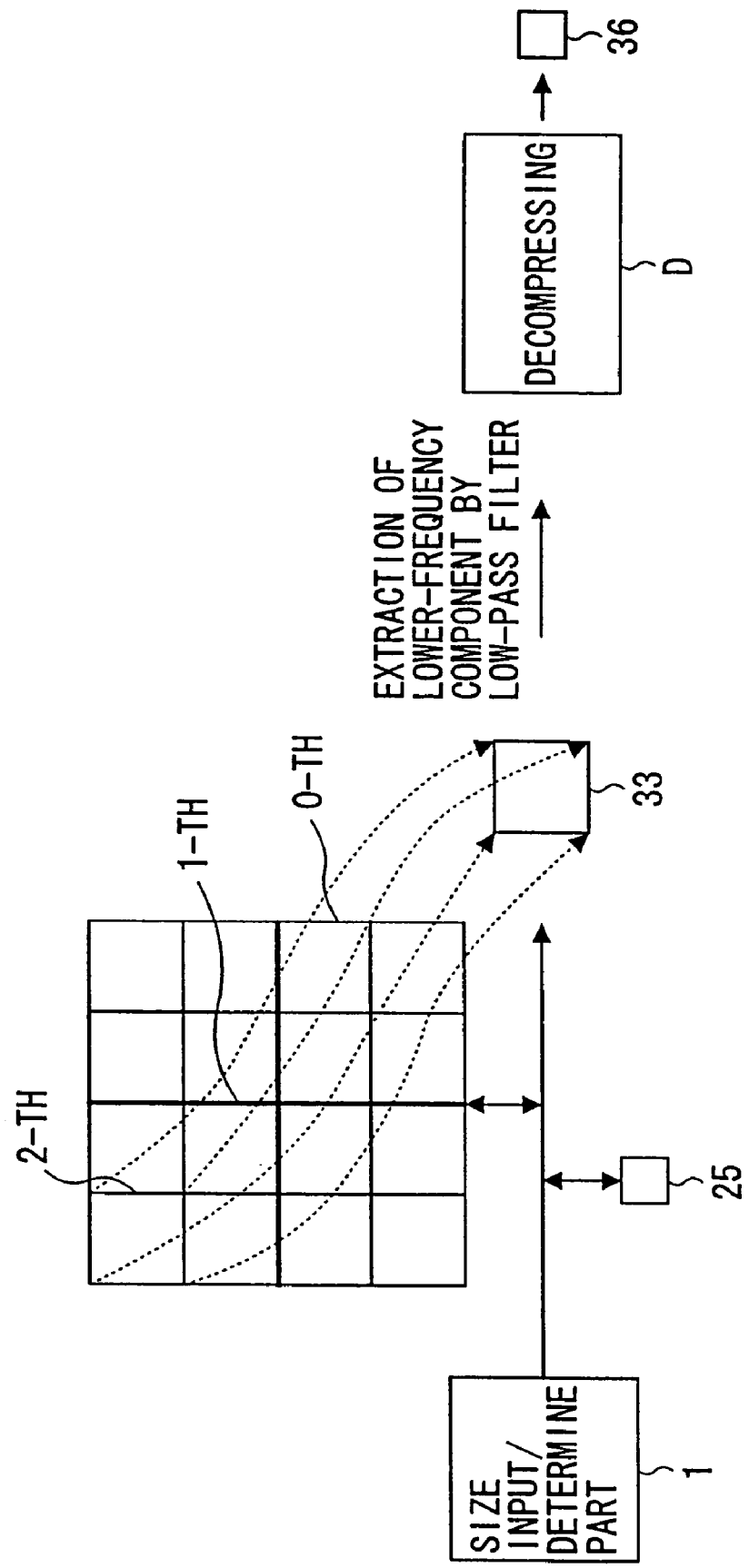
FIG. 6 shows an operation flow of the image decompressing method in the fourth embodiment of the present invention in a case where a size of image indicated by a user is smaller than the size of the lowest-frequency-component LL subband of the subband transform coefficients in the highest or last decomposition level.

Further, similar to the above-described third embodiment, when the decompressed image size determined by the image size determination step 1 is smaller than the size of the LL subband in the highest (last) decomposition level, decomposing processing is performed on the subband transform coefficients of the LL subband in the highest (last) decomposition level so as to obtain the subband transform coefficients of a lower-frequency component than the lowest (vertically and horizontally) LL subband of the current highest/last decomposition level. This processing is repeated until the size of the subband transform coefficients of the thus-obtained lower-frequency component becomes smaller than the decompressed image size determined by the image size determination step 1, as shown in FIG. 6. After that, by using the decompressing step D, a decompressed image having the size smaller than the desired/determined image size.

This decomposition processing may be performed such that, after level shift is performed so as to make a color component expressed by the system be expressed by a non-sign integer, and, then, a lower-frequency component (LL subband, for example) than the lowest (vertically and horizontally) LL subband in the current highest (last) decomposition level is obtained by using the operation formula used in the subband filter bank as it is. Alternatively, a lower-frequency component (LL subband, for example) than the lowest (vertically and horizontally) LL subband in the current highest (last) decomposition level may be obtained by simply taking an average of contiguity pixels. Since no additional hardware is needed in such a scheme, and, in the case of taking an average, merely an addition circuit and a shift circuit are needed. Accordingly, high-speed operation is possible.

The present invention is not limited only to the above-described embodiments. The respective functions (the above-mentioned image size determination step 1, decompressing step D, size change determination step 3, size-change processing step 4, interpolation determination step 5, interpolation processing step 6, and so forth are expressed as a software program by which a computer (such as that shown in FIG. 7) can be made to execute these functions actually. The software program is for example recorded in a recording medium such as a magnetic medium (for example, a magnetic tape, a flexible disk, a hard disk, etc.), a semiconductor memory (for example, a ROM, an IC memory card, etc.), an optical medium (for example, a DVD, an MO, an MD, a CD-R, etc.), or the like, to load it into various apparatuses.

The computer (see FIG. 7) which embodies the present invention performs the processing described above by reading the software program recorded on this recording medium, and controlling operation by the software program.

Figure 7:
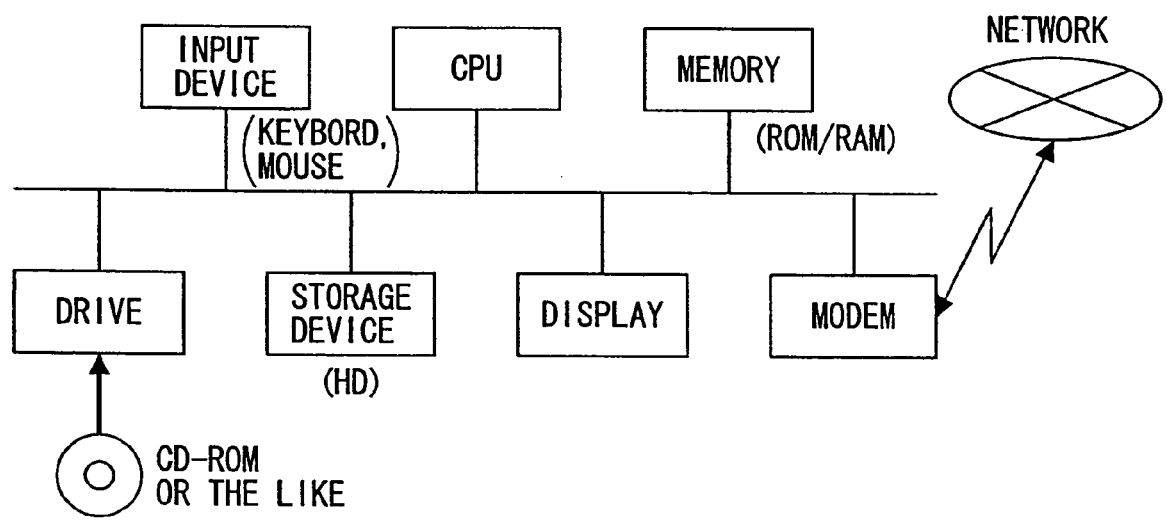
FIG. 7 illustrates a configuration of a general-purpose computer by which the present invention may be embodied.

Moreover, the above-mentioned program may be downloaded from a server connected with a network, such as the Internet, and, thus, it may be installed into the computer such as that shown in FIG. 7. In this case, a memory storage which stores therein the above-mentioned software program in the server may also be included in the scope of the present invention.

In addition, based on instructions of the software program, an operating system etc. performs a part or all of the actual processing, and when the functions of the embodiments described above are embodied by the processing, these operation are also included in the scope of the present invention.

Thus, since the above-described functions can be embodied by a computer through a software program as described above, experiment of operation, reuse, and evaluation of coefficients obtained from coding an image by wavelet transform or subband transform scheme can be performed.

Figure 8:
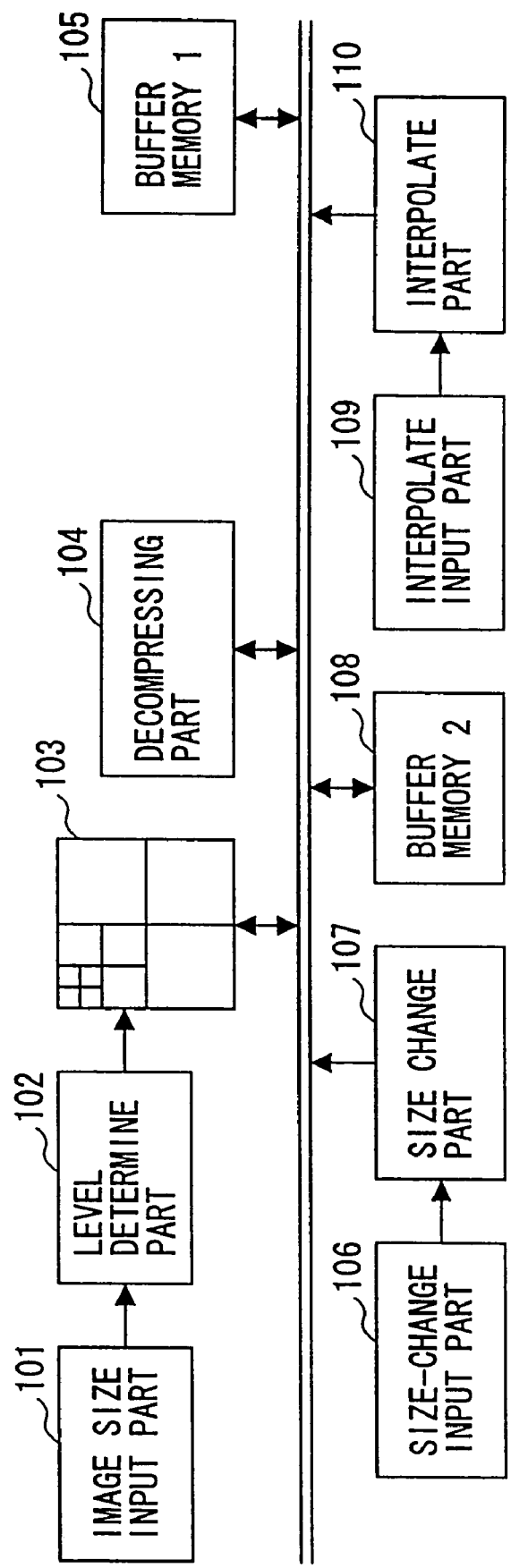
FIG. 8 shows a block diagram illustrating an image decompressing apparatus in a first embodiment of the present invention corresponding to the image decompressing methods in the first and third embodiments of the present invention shown in FIGS. 1 and 3.
Figure 9:
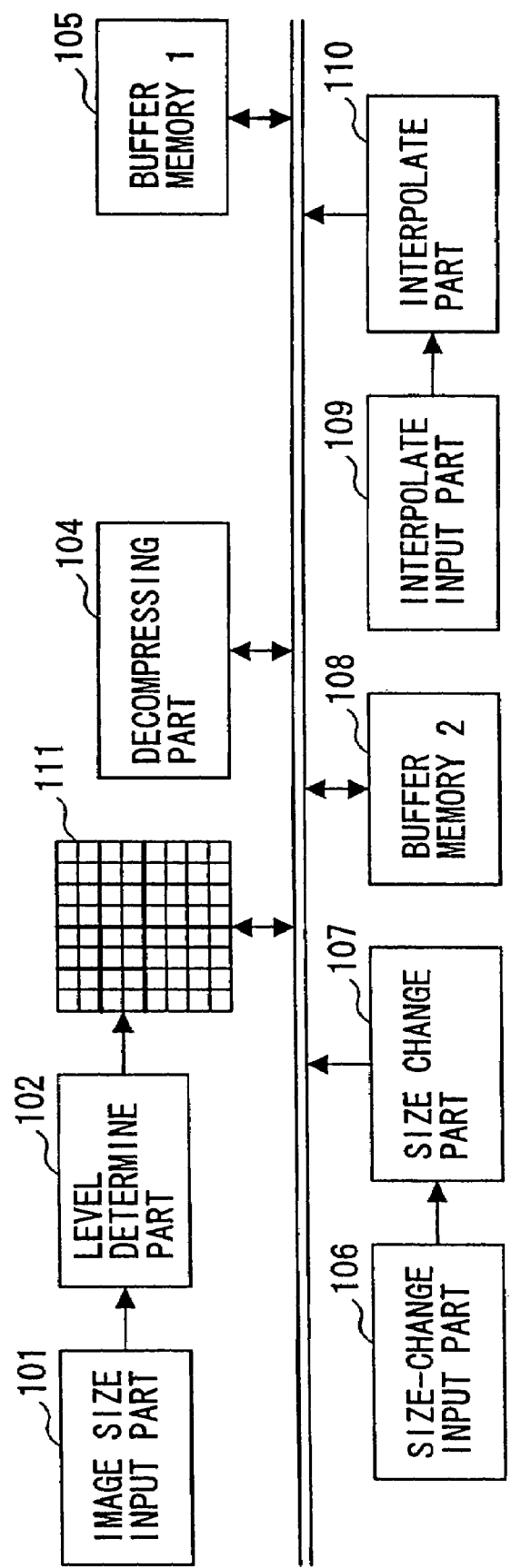
FIG. 9 shows a block diagram illustrating an image decompressing apparatus in a second embodiment of the present invention corresponding to the image decompressing methods in the second and fourth embodiments of the present invention shown in FIGS. 2 and 5.

FIGS. 8 and 9 show block diagrams illustrating configurations of image decompressing apparatuses configured to execute the functions of the above-described first through fourth embodiments of the present invention, respectively.

For example, in FIG. 8 (corresponding to the first and third embodiments), the apparatus includes an image size input part 101 for a user to input a desired image size. For example, in dealing with images taken by a digital camera, thumbnail images obtained by reducing the size of the original images may be obtained and are displayed on a display device of a personal computer. In such a case, the user may input a size of image corresponding to thumbnail images.

Then, a level determine part 102 determines, based on the thus-input image size, by referring to decomposition-level-type wavelet transform coefficients previously stored in a wavelet transform coefficient memory 103, the level number 'i' (integer) of a decomposition level of wavelet transform coefficients such that the wavelet transform coefficients in the decomposition level 'i+1' has the size maximum but not larger than or equal to the input image size, and, also, the wavelet transform coefficients in the decomposition level 'i' has the size minimum but not smaller than the input image size. That is, the value 'i' is obtained according to the above-mentioned formula (1).

Then, a decompressing part 104 performs decomposition-level-type inverse wavelet transform from the highest or last decomposition level to the level i+1 or to the level i for the first embodiment. Alternatively, the decompressing part 104 performs decomposition-level-type inverse wavelet transform from the highest or last decomposition level to any level up to the level i+2 for the third embodiment. The thus-obtained decompressed image is stored in a buffer memory 105.

Then, as the necessity arises, a size-change input part 106 determines whether or not the size of the thus-obtained decompressed image is changed. When a user does not request size change, the decompressed image stored in the buffer memory 105 is output as it is as a bitmap image. When size change is requested through the size-change input part. 106, a size-change part 107 performs size-change processing on the decompressed image according to a size-change rate (=(determined/user-requested image size)/(the size of the decompressed image)). The thus-obtained size-changed image is stored in a buffer memory 108.

Further, as the necessity arises as mentioned above, and also, interpolation is requested through an interpolate input part 109, an interpolate part 110 performs interpolation operation on the size-change image stored in the buffer memory 108. The thus-obtained interpolated image is then stored in the buffer memory 105 which has been emptied previously.

The image decompressing apparatus shown in FIG. 9 corresponds to the above-described second and fourth embodiments of the present invention. That is, in this image decompressing apparatus, instead of wavelet transform coefficients stored in the wavelet transform coefficient storage memory 103, subband transform coefficients stored in a subband transform coefficient storage memory 111 are used. The other configuration and operation are the same as those described with reference to FIG. 8, and duplicated description is omitted. However, as described above for the second and fourth embodiments, the subband transform coefficients are decomposed into subbands uniformly with respect to the frequency bands and with regard to the vertical and horizontal positions as mentioned above as shown in FIGS. 2, 5 and 9, and, a lower-frequency component (located upper and lefter in the transform coefficient, in the figures, for example) may be preferably used for obtaining a decompressed image.

Further, the present invention is not limited to the above-described embodiments, and variations and modifications may be made without departing from the scope of the present invention.

The present application is based on Japanese priority applications Nos. 2000-344391, 2001-142942, 2000-344155 and 2001-195937, filed on Nov. 10, 2000, May 14, 2001, Nov. 10, 2000 and Jun. 28, 2001, the entire contents of which are hereby incorporated by reference.

The invention claimed is:

1. An image decompressing apparatus for obtaining a decompressed image from encoded image data, comprising:
   a wavelet transform part carrying out a wavelet transform to obtain transform coefficients of a low-frequency component and a high-frequency component;
   an image size determining part, with which an image size obtained after decompression of the image data, is determined;
   a calculating part calculating an integer i satisfying the following formula (1) from the image size determined by said image size determining part, with reference to the wavelet transform coefficients:

(original image size)/$2^{i+1}$ ≤ determined image size) < (original image size)/$2^i$; and    (1)

a decompressing part obtaining the decompressed image by carrying out an inverse-wavelet transform from the highest decomposition level through an arbitrary level from among decomposition levels up to the i+2-th decomposition level.

2. The image decompressing apparatus as claimed in claim 1, further comprising:
   a size-change determining part, with which whether or not a size change is carried out is determined; and
   a size-change part carrying out size change on the decompressed image, wherein:
   the determined image size is reached as a result of size change being carried out on the decompressed image for the determined image size by said size-change part.

3. The image decompressing apparatus as claimed in claim 2, further comprising:
   an interpolation determining part determining whether or not interpolation processing is carried out on the image data having undergone the size-change processing; and
   an interpolation part carrying out the interpolation processing on the image data, wherein:
   only the size-change processing is carried out when the interpolation processing is not determined by said interpolation determining part, while the interpolation processing is carried out on the image data when the interpolation processing is determined by said interpolation determining part.

4. The image decompressing part claimed in claim 1, wherein;
   when the image size determined by said image size determining part is smaller than that of the highest decomposition level, further lower-frequency components are produced from LL subband coefficients of the highest decomposition level in sequence, and the decompressed image is obtained by said decompressing part.

5. An image decompressing method for obtaining a decompressed image from encoded image data, comprising the steps of:
   a wavelet transform step of carrying out a wavelet transform to obtain transform coefficients of a low-frequency component and a high-frequency component;

an image size determining step of determining an image size obtained after decompression of the image data;

a calculating step of calculating an integer i satisfying the following formula (1) from the image size determined in said image size determining step, with reference to the wavelet transform coefficients:

$$\text{(original image size)}/2^{i+1} \leq \text{determined image size} < \text{(original image size)}/2^i; \text{ and} \qquad (1)$$

a decompressing step of obtaining the decompressed image by carrying out an inverse-wavelet transform from the highest decomposition level up to an arbitrary level from among decomposition levels up to the i+2-th decomposition level.

6. The image decompressing method as claimed in claim 5, further comprising:
   a size-change determining step of determining whether or not a size change is carried out; and
   a size-change step of carrying out size change on the decompressed image, wherein:
   the determined image size is reached as a result of size change being carried out on the decompressed image for the determined image size in said size-change step.

7. The image decompressing method as claimed in claim 6, further comprising:
   an interpolation determining step of determining whether or not interpolation processing is carried out on the image data having undergone the size-change processing; and
   an interpolation step of carrying out the interpolation processing on the image data, wherein:
   only the size-change processing is carried out when the interpolation processing is not determined in said interpolation determining step, while the interpolation processing is carried out on the image data when the interpolation processing is determined in said interpolation determining step.

8. The image decompressing method claimed in claim 5, wherein;
   when the image size determined in said image size determining step is smaller than that of the highest decomposition level, further lower-frequency components are produced from LL subband coefficients of the highest decomposition level in sequence, and a decompressed image is obtained in said decompressing step.

9. A computer readable information recording medium storing therein instructions for causing a computer to obtain a decompressed image from encoded image data, by carrying out:
   a wavelet transform step of carrying out a wavelet transform to obtain transform coefficients of a low-frequency component and a high-frequency component;
   an image size determining step of determining an image size obtained after decompression of the image data;
   a calculating step of calculating an integer i satisfying the following formula (1) from the image size determined in said image size determining step, with reference to the wavelet transform coefficients:

$$\text{(original image size)}/2^{i+1} \leq \text{determined image size} < \text{(original image size)}/2^i; \text{ and} \qquad (1)$$

a decompressing step of obtaining the decompressed image by carrying out an inverse-wavelet transform from the highest decomposition level up to an arbitrary level from among decomposition levels up to the i+2-th decomposition level.

10. The computer readable information recording medium as claimed in claim 9, wherein:
    said instructions further causing the computer to further carry out:
    a size-change determining step of determining whether or not size change is carried out; and
    a size-change step of carrying out size change on the decompressed image, wherein:
    based on the instructions,
    the determined image size is reached as a result of size change being carried out on the decompressed image for the determined image size in said size-change step.

11. The computer readable information recording medium as claimed in claim 10, wherein:
    said instructions further causing the computer to further carry out:
    an interpolation determining step of determining whether or not interpolation processing is carried out on the image data having undergone the size-change processing; and
    an interpolation step of carrying out the interpolation processing on the image data, wherein:
    based on the instructions,
    only the size-change processing is carried out when the interpolation processing is not determined in said interpolation determining step, while the interpolation processing is carried out on the image data when the interpolation processing is determined in said interpolation determining step.

12. The computer readable information recording medium as claimed in claim 9, wherein:
    based on the instructions,
    when the image size determined in said image size determining step is smaller than that of the highest decomposition level, further lower-frequency components are produced from LL subband coefficients of the highest decomposition level in sequence, and a decompressed image is obtained in said decompressing step.

* * * * *